(12) United States Patent
Pruehl et al.

(10) Patent No.: US 11,806,675 B2
(45) Date of Patent: Nov. 7, 2023

(54) METHOD OF VACUUM MEMBRANE FILTRATION

(71) Applicant: Sartorius Stedim Biotech GmbH, Goettingen (DE)

(72) Inventors: Sebastian Pruehl, Goettingen (DE); Karl Pflanz, Goettingen (DE); Juliane Grossmann, Goettingen (DE); Michael Schuetzler, Goettingen (DE)

(73) Assignee: SARTORIUS STEDIM BIOTECH GMBH

( * ) Notice: Subject to any disclaimer, the term of this patent is extended or adjusted under 35 U.S.C. 154(b) by 0 days.

(21) Appl. No.: 18/101,064

(22) Filed: Jan. 24, 2023

(65) Prior Publication Data

US 2023/0166220 A1    Jun. 1, 2023

Related U.S. Application Data

(62) Division of application No. 16/761,893, filed as application No. PCT/EP2018/078182 on Oct. 16, 2018, now abandoned.

(30) Foreign Application Priority Data

Nov. 27, 2017    (DE) .................... 10 2017 127 970.9

(51) Int. Cl.
*B01D 69/10*    (2006.01)
*B01D 63/08*    (2006.01)

(52) U.S. Cl.
CPC .......... *B01D 69/10* (2013.01); *B01D 63/087* (2013.01); *B01D 2313/025* (2013.01);
(Continued)

(58) Field of Classification Search
CPC .......... B01D 2313/025; B01D 2313/04; B01D 2313/10; B01D 2313/24; B01D 2315/08; B01D 63/087; B01D 69/10
See application file for complete search history.

(56) References Cited

U.S. PATENT DOCUMENTS 3,929,648 A    12/1975    Cuthbert
4,777,137 A    10/1988    Lemonnier
(Continued)

FOREIGN PATENT DOCUMENTS

CN    103212226 A    7/2013
CN    103495299 A    1/2014
(Continued)

*Primary Examiner* — Pranav N Patel
(74) *Attorney, Agent, or Firm* — Dilworth IP, LLC

(57) ABSTRACT

A method of vacuum membrane filtration including placing a membrane filter between a filtration base and a pouring funnel, an upper side of the filtration base having a membrane bearing area with a bearing structure and a supporting contour surrounding the bearing structure and the supporting contour having at least one notch in flow connection with a bottom side of the membrane bearing area, detachably mounting the pouring funnel on the filtration base thereby clamping the membrane filter between the filtration base and the pouring funnel, applying suction to the filtration base such that the membrane filter is pulled against the bearing structure and comes into contact with the supporting contour, and dismounting the pouring funnel from the filtration base while still applying the suction, causing an outer rim of the membrane filter to bulge upward from the supporting contour and uncover the at least one notch.

20 Claims, 3 Drawing Sheets

(52) U.S. Cl.
CPC ...... *B01D 2313/04* (2013.01); *B01D 2313/10* (2013.01); *B01D 2313/24* (2013.01)

(56) References Cited

U.S. PATENT DOCUMENTS

| | | |
|---|---|---|
| 4,792,398 A | 12/1988 | Klein |
| 5,454,951 A | 10/1995 | Hoopman |
| 5,603,900 A | 2/1997 | Clark et al. |
| 6,358,730 B1 | 3/2002 | Kane |
| 7,806,274 B2 | 10/2010 | Scott et al. |
| 9,624,463 B2 | 4/2017 | Wainwright et al. |
| 2002/0096468 A1 | 7/2002 | Zuk, Jr. |
| 2006/0144781 A1 | 7/2006 | Carlson et al. |
| 2008/0078717 A1 | 4/2008 | Shigesada et al. |
| 2016/0010052 A1 | 1/2016 | Wainwright et al. |

FOREIGN PATENT DOCUMENTS

| | | |
|---|---|---|
| CN | 105874052 A | 8/2016 |
| DE | 69614001 T2 | 3/2002 |
| DE | 69633029 T2 | 7/2005 |
| DE | 112004000225 T5 | 1/2006 |
| DE | 102005008220 B3 | 8/2006 |
| EP | 0239058 A2 | 9/1987 |
| EP | 1911519 A2 | 4/2008 |
| JP | S60180577 A | 9/1985 |
| JP | 2008086893 A | 4/2008 |
| JP | 2016534760 A | 11/2016 |
| WO | 9832875 A1 | 7/1998 |
| WO | 2017088951 A1 | 6/2017 |

METHOD OF VACUUM MEMBRANE FILTRATION

FIELD OF THE INVENTION

The invention relates to a filtration base for vacuum membrane filtration applications.

BACKGROUND OF THE INVENTION

A filtration base, together with a pouring funnel and a circular membrane filter clamped between these two components, forms a filtration device to which a vacuum (negative pressure) is usually applied during filtration operation. With known devices, the clamping of the membrane filter is ensured by a circumferential bulge at the foot of the funnel and by a circumferential offset at the filtration base. The bulge can engage into the offset, thus pressing the outer circumference of the membrane filter onto a sealing face of the filtration base. Typically, liquid volumes of 0 to 300 ml may be filled into the funnels of such filtration devices. During filtration operation, a vacuum is applied to the bottom side of the membrane filter to suck the liquid present in the funnel through the membrane filter resting on the filtration base. For this purpose, the filtration base includes a sealing contour on its bottom side for connection to a suction device.

After filtration using a filtration device consisting of a filtration base, a membrane filter and a funnel, no air can be sucked through the membrane filter by means of a vacuum pump due to the high bubble pressure. This is because the pores of the membrane filter are so small that the vacuum cannot overcome the surface tension of the water in these small pores. Furthermore, the membrane filter rests on the filtration base to which it has a tight connection after wetting with water, even after the funnel has been removed. For these reasons, a considerable amount of liquid which cannot be sucked off easily is still present under the membrane filter after a filtration, which can lead to problems, in particular, during microbiological works.

SUMMARY OF THE INVENTION

Therefore, the object of the invention is to achieve with simple means a targeted aeration directly below the membrane filter in a vacuum membrane filtration device, in order to ensure the removal of the residual liquid below the membrane filter after having detached the funnel.

This object is achieved by a filtration base for vacuum membrane filtration applications having the claimed features. Advantageous and useful designs of the filtration base according to the invention are specified in the subclaims.

The filtration base according to the invention is provided for vacuum membrane filtration applications and comprises a membrane bearing area on the upper side of the filtration base, which has a bearing structure and a supporting contour surrounding the bearing structure for a membrane filter placed in the membrane bearing area. According to the invention, the supporting contour has at least one notch which is in flow connection with the bottom side of the membrane bearing area and which is arranged such that it is adapted to be selectively covered by a membrane filter placed in the membrane bearing area.

The invention is based on the findings that in a vacuum membrane filtration device, no complex construction including a valve or the like which is provided especially for this purpose and which has to be switched separately is required for a selective aeration of the bottom side of the wetted membrane filter if the behavior of the membrane filter after removal of the funnel is exploited by a small but clever constructional measure. More specifically, the invention makes use of the fact that the wetted membrane filter, which is still sucked to the upper side of the filtration base by the applied vacuum, is no longer clamped at the rim without the funnel, so that the rim can bulge upwards. With the filtration base according to the invention, this deformation of the membrane filter can be used to cause a deliberate leakage in the interaction between the membrane filter and the filtration base by releasing a notch specifically provided for aeration, which was previously covered by the clamped membrane filter. The released notch—assisted by the vacuum still applied—allows the ambient air to flow to the bottom side of the membrane filter, such that the residual liquid still present below the membrane filter can be sucked off and the membrane filter can be easily removed from the filtration base.

Preferably, the supporting contour is delimited from the bearing structure by a circumferential edge, and the notch provided according to the invention interrupts this circumferential edge between the bearing structure and the supporting contour. When the rim of the membrane filter is no longer clamped and the vacuum pulls the center portion of the membrane filter down onto the bearing structure of the filtration base, the membrane filter is pressed against the edge between the bearing structure and the supporting contour. Therefore, the membrane filter in principle still tightly rests against the filtration base at this point; however, the interruption created by the notch provides for the desired leakage, which permits an air flow below the membrane filter.

To ensure its function, the notch should be delimited from its surroundings by edges which are as sharp as possible. Otherwise, i.e., if the edges of the notch were too rounded, there would be the risk that the membrane filter contacts the rounded shapes too easily and thus forms in an undesirable manner a tight connection with the filtration base also at this point. In this respect, the shape and dimensions of the notch are adapted to the stiffness of commercially available membrane filters, such that an undesired tight application of such a membrane filter in the wetted state at a typical suction negative pressure is excluded.

The function of the notch may be assisted by the fact that the notch extends into the supporting contour, particularly if the filtration base is manufactured as an injection-molded plastic part and the desired sharp-edged delimitation of the notch is not easily ensured due to manufacturing tolerances. Owing to this increase in the size of the notch, an enlarged suction window is then available.

A preferred embodiment of the filtration base according to the invention is configured such that the supporting contour on its outside adjoins a sealing face onto which the rim of the membrane filter may be pressed by a pouring funnel put onto the filtration base. In such a design, the membrane filter clamped between the funnel and the sealing face of the filtration base tightly rests against the supporting face when a vacuum is applied, such that the notch is covered. If, on the other hand, the rim area of the membrane filter is no longer pressed onto the sealing face by the funnel after filtration, a slight upward bulging of the membrane filter rim is already sufficient to release a flow path below the membrane filter due the notch formed in the adjoining supporting contour.

The notch should not extend from the supporting contour into the sealing face to not impair the tight rest of the membrane filter rim in the clamped state.

Ideally, the bearing structure and the sealing face are arranged offset to each other, a difference in height between the bearing structure and the sealing face being bridged by the supporting contour. This means that the rim of the membrane filter initially clamped by the funnel is arranged higher than the central area of the membrane filter sucked against the bearing area. After removal of the funnel, this design assists the desired upward bulging of the membrane filter rim to release the notch.

Typical filtration bases for vacuum membrane filtration devices include a membrane bearing area having an outer diameter in the range of 15 to 55 mm. The outside diameter preferred here is in the range of 25 to 50 mm, particularly preferably of 45 to 50 mm. It has proven to be particularly useful to provide the at least one notch at a distance in the range of 2 to 10 mm, preferably of 3 to 7 mm from this outside diameter.

In a preferred embodiment of the filtration base according to the invention, the supporting contour is annular, and provision is made for a plurality of notches which are spaced apart from each other in the circumferential direction. Due to the plurality of notches arranged in a distributed manner in the supporting contour, a reliable aeration is ensured even if one notch is blocked.

In view of a preferred symmetrical design, each angular distance between the notches is of equal size and is preferably 30°.

The at least one notch provided according to the invention in the supporting contour of the filtration base may basically be a recess of any shape which establishes the desired flow connection to the bottom side of the membrane filter. However, it must be ensured that the membrane filter is not sucked into the notch according to the invention when the funnel is removed so as to still block the flow connection. The notch should be dimensioned very small in accordance with this requirement to ensure that the membrane filter cannot significantly penetrate the notch due to its inherent stiffness. It has been shown that notches having a width in a range of 0.1 to 4 mm in the circumferential direction meet this requirement.

Of course, each notch should also have a minimum depth to allow air to pass through. A preferred depth is in the range of 0.1 to 1.5 mm.

A particularly advantageous design provides that the at least one notch is a prolongation of a discharge groove formed in the bearing structure. The aim is to suck off as much of the residual liquid still present in the bearing structure as possible after filtration. In the bearing structure of the filtration base, discharge grooves are provided to collect the liquid sucked through the membrane filter during filtration and to allow it to flow to the discharge of the filtration base. If after filtration air is sucked under the membrane filter due to the notches and is specifically directed into a discharge groove, the entrainment of residual liquid is particularly effective.

The filtration base according to the invention may be designed as a reusable or single-use component. In the former case, it is preferably made of stainless steel, in the latter case preferably of a sterilizable plastic material. This opens up the possibility of pre-sterilizing the filtration base—if necessary along with further components of the filtration device. The filtration base is thus ready for use immediately after delivery.

The invention also provides a filtration device comprising a filtration base according to the invention, a pouring funnel detachably mounted on the filtration base, and a membrane filter clamped between the filtration base and the pouring funnel.

For clamping the membrane filter, a sealing face surrounding the supporting contour may be provided on the side of the filtration base and a matching bulge may be provided on the side of the funnel to press the rim of the membrane filter onto the sealing face. In principle, the sealing face and the bulge may also be reversed, i.e.m the sealing face can be formed on the funnel and the bulge on the filtration base. Due to the sealing achieved in this way, filtration is also possible without the suction of air when the filter is fitted.

For typical applications, however, the filtration base is connected to a suction device by means of which a vacuum (negative pressure) is produced under the filtration base to accelerate the filtration process or make it possible at all.

As already explained, the at least one notch should be dimensioned so small that the membrane filter does not come into tight contact with the contour of the notch due to its stiffness in case of a negative pressure generated by the suction device for a filtration process.

With regard to a preferred single use application, the filtration base and/or the funnel are made of a (pre-)sterilizable plastic material. If a multiple use application is intended, these components are typically made of stainless steel or aluminum. In any case, the filtration device according to the invention is adapted to be mounted on a negative pressure-based suction device (suction strip). The suction device may in turn be made of sterilizable stainless steel or aluminum (multiple use) or of sterilizable plastic material (single use).

BRIEF DESCRIPTION OF THE DRAWINGS

Further features and advantages of the invention will become apparent from the description below and from the accompanying drawings to which reference is made and in which.

DETAILED DESCRIPTION OF THE INVENTION

Figure 1:
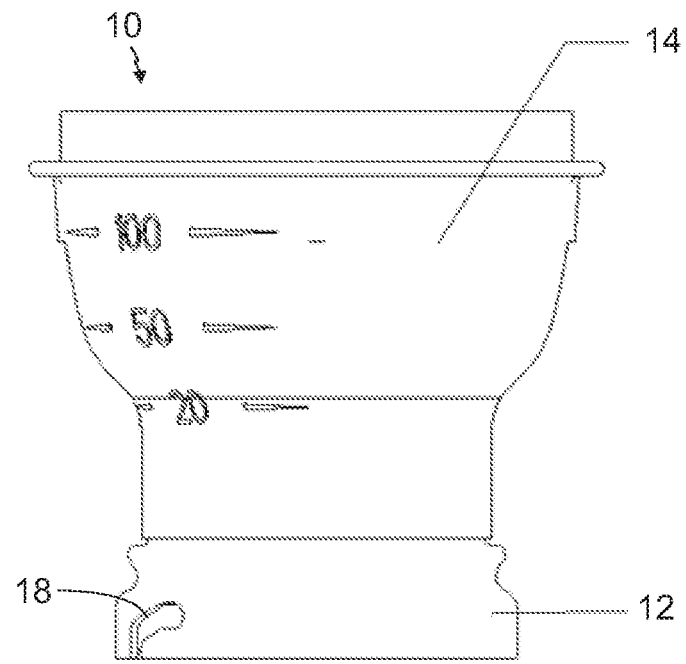
FIG. 1 shows a side view of a filtration device according to the invention.

FIG. 1 shows a filtration device 10 intended for vacuum membrane filtration applications. A pouring funnel 14 is detachably mounted on a filtration base 12. The filtration base 12 and the funnel 14 are typically reusable stainless steel units. However, in the present case, designs made of plastic material which are adapted to be pre-sterilized and which are intended for a single use are preferred.

Figure 6:
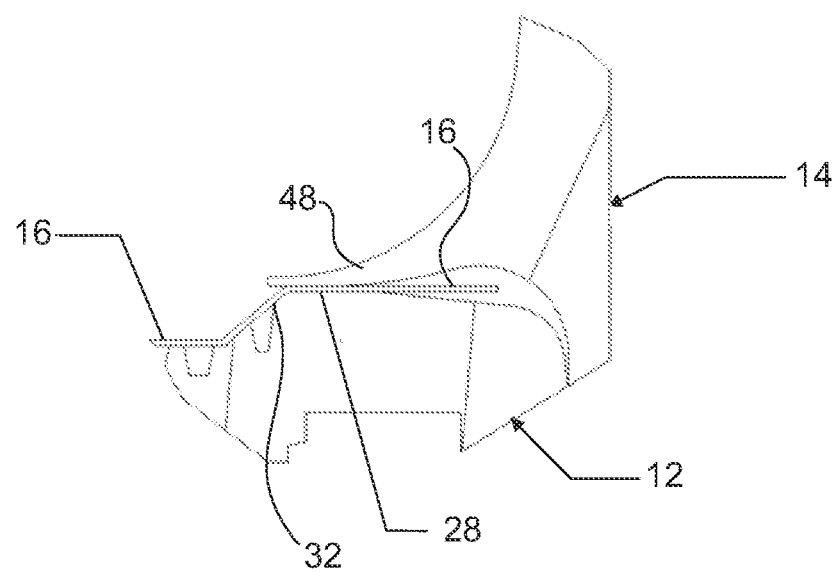
FIG. 6 is a cutaway detailed view of the clamping area of the filtration device of FIG. 1.

A membrane filter 16 (see sectional view in FIG. 6) is clamped between the filtration base 12 and the funnel 14.

The filtration device 10 can be mounted on a suction strip or on another suction device made of stainless steel (multiple use) or of plastic material (single use). To this end, a recess 18 is provided in the filtration base 12, which together with a matching projection on a connection piece of the suction device forms a bayonet lock. The fixation may also be realized by means of a plug-in connection in which no rotary movement as with the bayonet lock is required.

Figure 2:
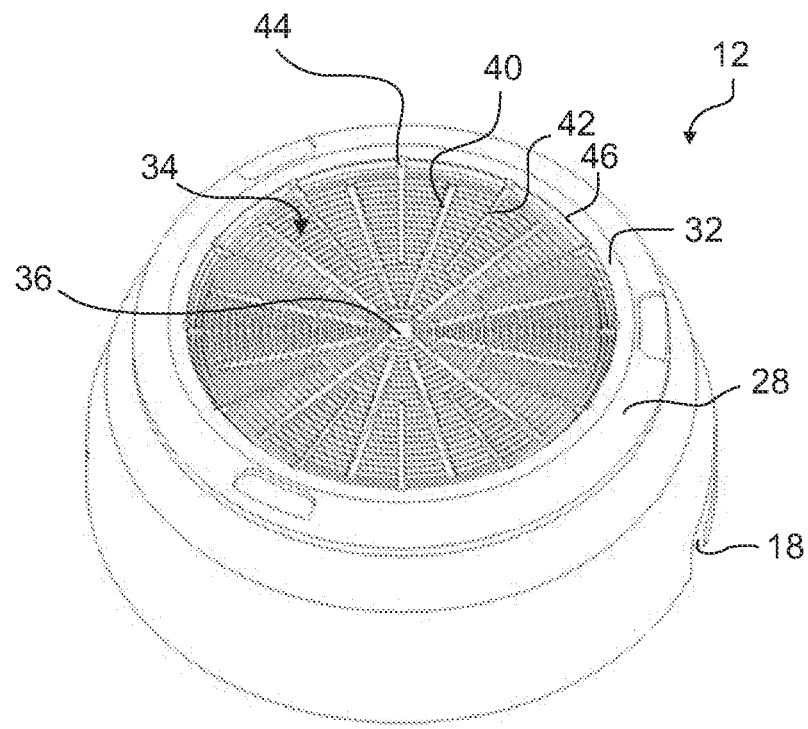
FIG. 2 shows a perspective view of the filtration base according to the invention of the filtration device of FIG. 1.
Figure 3:
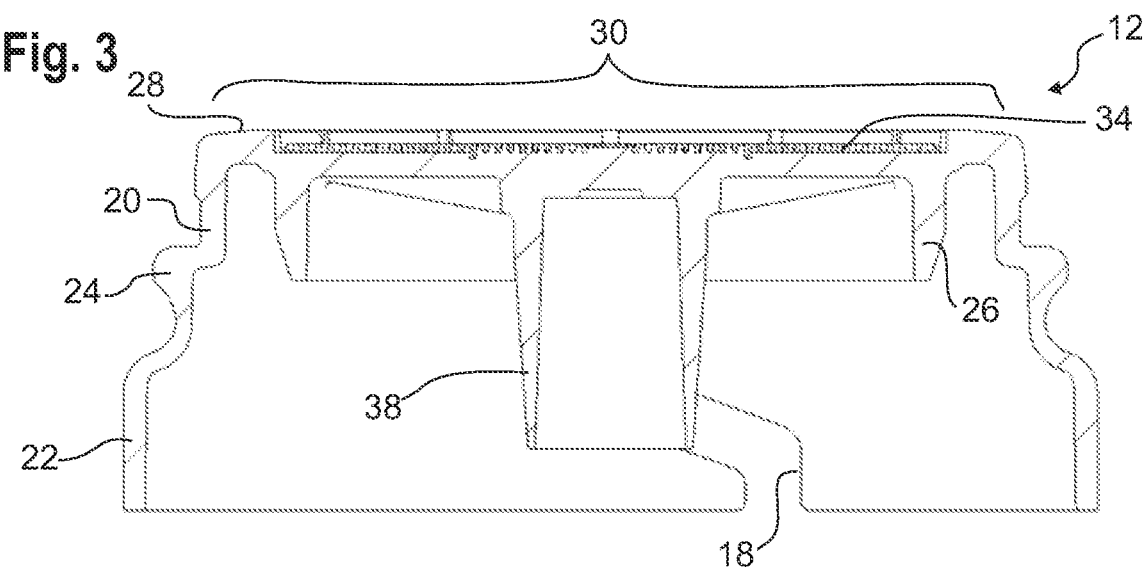
FIG. 3 shows a side sectional view of the filtration base of FIG. 2.

The filtration base 12 is shown separately in FIGS. 2 and 3. The basic circular filtration base 12 has an upper first cylindrical portion 20 having a preferred outer diameter of 49 mm and a lower second cylindrical portion 22 below the shoulder. The funnel 14 is pushed onto the first cylindrical portion 20, a circumferential shoulder 24 serving as a bearing surface for the front side of the funnel 14. The lower cylindrical portion 22 is connected to the connection piece of the suction device via the bayonet lock or the plug-in connection such that the connection piece is pressed against a sealing contour 26 and/or a limiting wall 38 of the filtration base 12, which will be explained in more detail later. A tight connection to a vacuum (negative pressure) provided by the suction device is thus ensured.

Figure 4:
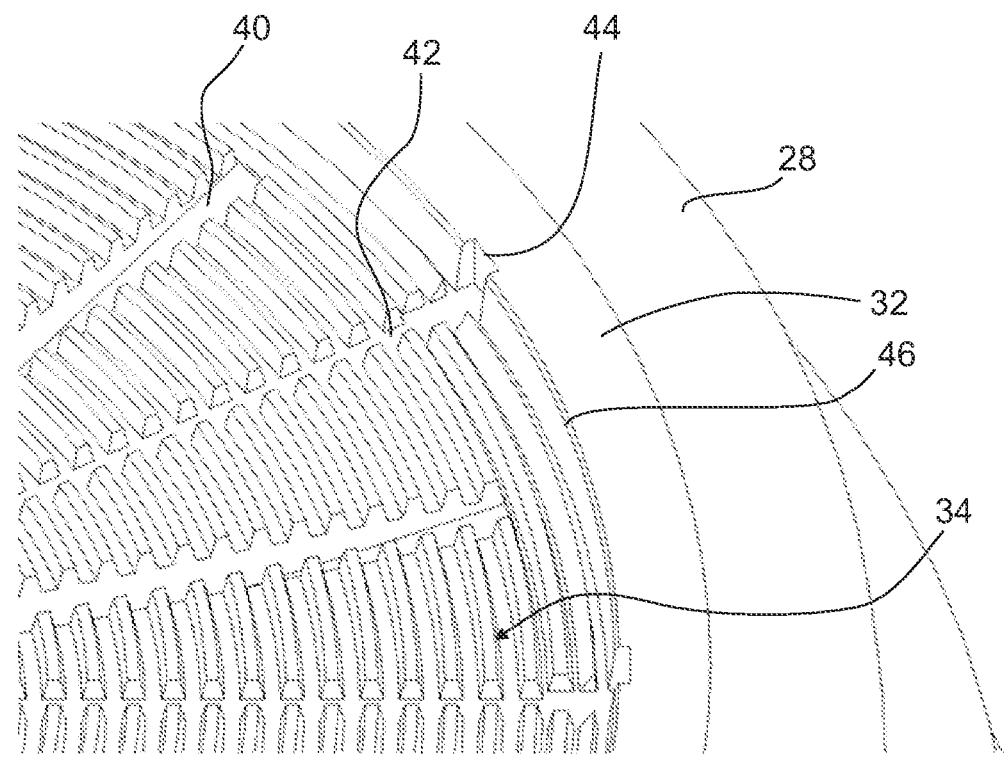
FIG. 4 shows a perspective view of a boundary area of the filtration base of FIG. 3.
Figure 5:
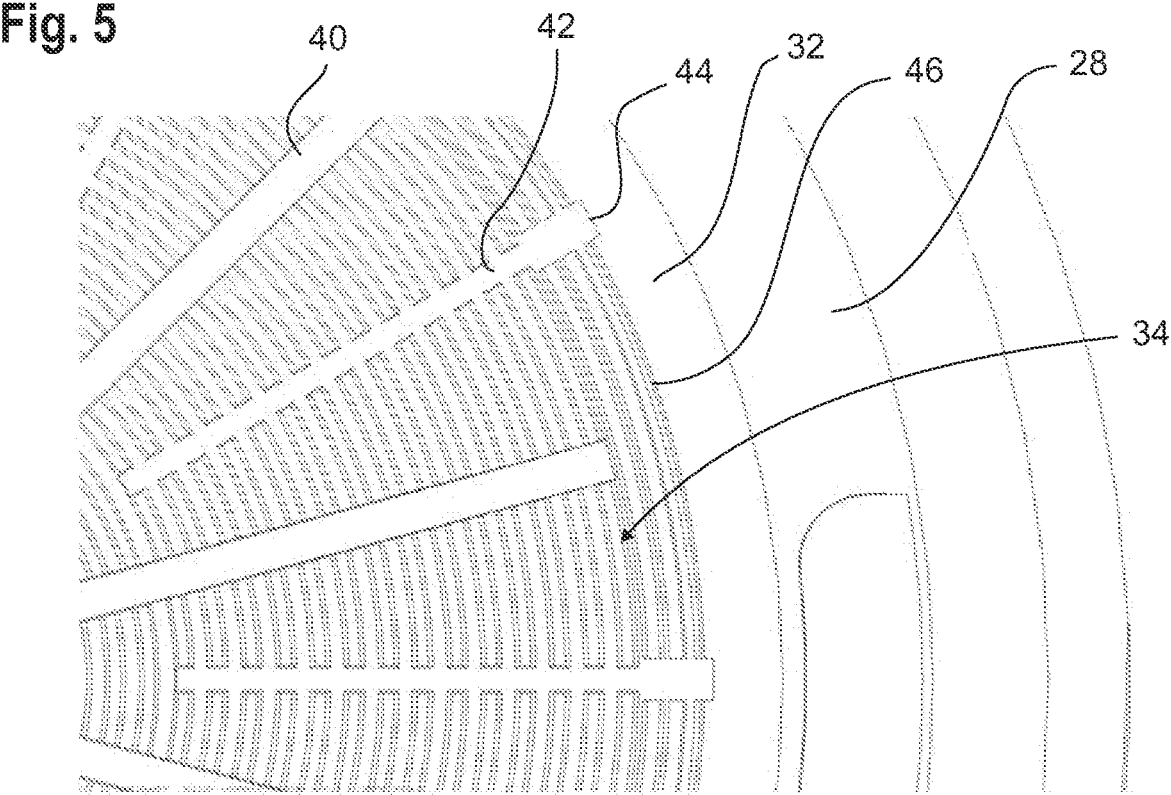
FIG. 5 shows a top view of a boundary area of the filtration base of FIG. 3.

As can be seen in FIGS. 3 to 5, the filtration base 12 has on its upper side a membrane bearing area 30, which is divided into an annular sealing face 28 adjoining the upper cylindrical portion 20, a supporting contour 32 adjoining the sealing face 28, and a profiled bearing structure 34 surrounded by the supporting contour 32. Both the sealing face 28 and the profiled bearing structure 34 extend substantially in a plane which is perpendicular to the central axis of the filtration base 12. However, the profiled bearing structure 34 is offset downwards with respect to the sealing face 28, the supporting contour 32 extending between the profiled bearing structure 34 and the raised annular sealing face 28.

On the one hand, the supporting contour 32 constitutes a defined delimitation to the annular sealing face 28, on the other hand, it may be designed as a prolongation of the profiled bearing structure 34 or as another profiled structure (e.g., with steps) or as a flat surface. In either case, the supporting contour 32 bridges the axial height difference between the profiled bearing structure 34 and the sealing face 28.

The membrane bearing area 30 is interrupted in the middle by a central discharge 36 which creates a flow connection to the area below the membrane bearing area 30 and thus to the suction device. The downward projecting limiting wall 38 of the discharge 36 can be used as a sealing face 28 for the connection to the suction device in addition or alternatively to the sealing contour 26.

The profiled bearing structure 34 of the membrane bearing area 30 has a multitude of concentric grooves, other structures being however also possible. Several discharge grooves 40, 42 ensure that the liquid that has passed through the membrane filter 16 can reach the discharge 36. The discharge grooves 40, 42 are evenly distributed in the circumferential direction and run straight in a radial direction. In the example embodiment shown, four large discharge grooves 40 are provided at 90° intervals and 12 small discharge grooves 42 are provided at 30° intervals.

As can be seen in the detailed views of FIGS. 4 and 5, the large discharge grooves 40 extend outwards not completely up to the inclined supporting contour 32, while the small discharge grooves 42 each end in a notch 44 in the supporting contour 32. The notch 44 interrupts a circumferential edge 46 between the supporting contour 32 and the profiled bearing structure 34. The contour 32 supporting the membrane filter 16 is thus interrupted in the circumferential direction at an angular distance of respectively 30° by a notch 44.

The notches 44, which are delimited by sharp edges, each have a width of 1.0 mm and a depth of 1.4 mm and are located in an area that is inwardly spaced by 4.6 mm to 5.6 mm from the outer circumference of the upper cylindrical portion 20.

In the example embodiment shown, the notches 44 extend radially into the supporting contour 32 (see FIGS. 4 and 5). Depending on the material used and the precision of the manufacturing process, this radial extension is not absolutely necessary for the function of the notches 44 as explained further below, but is particularly recommended if the filtration base 12 is manufactured as an injection-molded plastic part.

The filtration operation of the filtration device 10 and the subsequent aeration are described in the following.

Prior to the filtration operation, a membrane filter 16 is placed onto the upper side of the filtration base 12, and the pouring funnel 14 is put onto the filtration base 12. An inwardly directed circumferential bulge 48 of the funnel 14 thus presses the outer rim of the membrane filter 16 firmly onto the sealing face 28 of the filtration base 12, as shown in the detailed view of FIG. 6.

Although, in principle, filtration with overpressure on the side of the funnel 14 is also possible, the filtration device 10 is usually connected to a suction device which creates a vacuum below the filtration base 12 in order to suck the liquid contained in the funnel 14 through the membrane filter 16 clamped between the filtration base 12 and the funnel 14. The membrane filter 16 is thus pulled against the profiled bearing structure 34 of the membrane bearing area 30 and comes into contact with the supporting contour 32. The liquid sucked in by the membrane filter 16 is directed through the profiled bearing structure 34 and the discharge grooves 40, 42 to the discharge 36.

After filtration, the funnel 14 is removed while the vacuum is still applied. Since the membrane filter 16 is now no longer pressed against the sealing face 28 by the funnel 14, the rim of the wetted membrane filter 16, which is still attracted to the filtration base 12 by the vacuum, may bulge upwards, as shown in the detailed views in FIGS. 5 and 6. However, the membrane filter 16 still rests firmly against the inclined supporting contour 32 and the edge 46 between the supporting contour 32 and the sealing face 28, such that no ambient air can get below the membrane filter 16 in these contact areas.

However, since the edge 46 between the supporting contour 32 and the profiled bearing structure 34 is interrupted by the notches 44, air is sucked through the notches 44 into the small discharge grooves 42 and thus into the area below the membrane filter 16 at these points due to the vacuum applied.

As already explained, the notches 44 are very small (width in the circumferential direction and depth) and are delimited by sharp edges. For this reason, in case of a negative pressure typical of a filtration process, a commercially available membrane filter 16 in the wetted state is not drawn into the notches 44 due to its stiffness and does not hinder the suction of air or the removal of the residual liquid. If the notches 44 extend radially into the supporting contour 32, as in the example embodiment shown, the suction of air through the notches 44 is ensured even if the edges of the notches 44 are less sharp, e.g., due to manufacturing tolerances.

Due to the sucked-in air, the volume of liquid present below the membrane filter 16 can flow off through the discharge 36. Furthermore, due to the aeration, it is relatively easy to lift the membrane filter 16 off the filtration base 12 despite the vacuum applied.

What is claimed is:

1. A method of vacuum membrane filtration, comprising steps of:
    placing a membrane filter between a filtration base and a pouring funnel, an upper side of the filtration base having a membrane bearing area with a bearing structure and a supporting contour surrounding the bearing structure for the membrane filter placed in the membrane bearing area, the supporting contour having at least one notch in flow connection with a bottom side of the membrane bearing area;
    detachably mounting the pouring funnel on the filtration base, thereby clamping the membrane filter between the filtration base and the pouring funnel;
    applying suction to the filtration base such that the membrane filter is pulled against the bearing structure and comes into contact with the supporting contour; and
    dismounting the pouring funnel from the filtration base while still applying the suction, causing an outer rim of the membrane filter to bulge upward from the supporting contour and uncover the at least one notch.

2. The method according to claim 1, further comprising a step of filling the funnel with a liquid volume after detachably mounting the pouring funnel on the filtration base, wherein as the suction is applied to the filtration base the liquid volume is filtered.

3. The method according to claim 2, wherein as the outer rim of the membrane filter is bulged upward from the supporting contour, and the at least notch is uncovered, residual liquid present below the membrane filter is sucked off.

4. The method according to claim 1, wherein the membrane filter covers the at least one notch when the membrane filter is clamped between the filtration base and the pouring funnel and the suction is applied to the membrane filter via a lower side of the filtration base.

5. The method according to claim 1, wherein the at least one notch interrupts a circumferential edge between the bearing structure and the supporting contour.

6. The method according to claim 5, wherein the at least one notch is delimited by sharp edges.

7. The method according to claim 6, wherein the at least one notch extends into the supporting contour.

8. The method according to claim 1, wherein an outside of the supporting contour adjoins a sealing face onto which a rim of the membrane filter is pressed by the pouring funnel being mounted onto the filtration base.

9. The method according to claim 8, wherein the at least one notch does not extend into the sealing face.

10. The method according to claim 8, wherein the bearing structure and the sealing face are arranged offset to each other and in that a difference in height between the bearing structure and the sealing face is bridged by the supporting contour being at an incline.

11. The method according to claim 1, wherein the membrane bearing area has an outer diameter of 15 to 55 mm and the at least one notch is formed at a distance of 2 to 10 mm from the outer diameter.

12. The method according to claim 1, wherein the supporting contour is annular and the at least one notch is a plurality of notches spaced apart from each other in a circumferential direction.

13. The method according to claim 12, wherein each angular distance between the notches is of equal size.

14. The method according to claim 12, wherein the notches have a width of 0.1 to 4 mm in the circumferential direction.

15. The method according to claim 12, wherein the notches have a depth of 0.1 to 1.5 mm.

16. The method according to claim 1, wherein the at least one notch is a prolongation of a discharge groove formed in the bearing structure.

17. The method according to claim 1, wherein the filtration base is made of a sterilizable plastic material.

18. The method according to claim 1, wherein the membrane filter is clamped between a sealing face surrounding the supporting contour and a bulge of the pouring funnel.

19. The method according to claim 1, further comprising a step of mounting the filtration base on a suction device for applying the suction to the filtration base.

20. The method according to claim 19, wherein the filtration base, the pouring funnel, and/or the suction device are made of a sterilizable plastic material.

\* \* \* \* \*